United States Patent [19]

Alford

[11] 4,453,750
[45] Jun. 12, 1984

[54] LOCK HOLDER

[76] Inventor: Vincent Alford, 2350 Bayview La., North Miami, Fla. 33181

[21] Appl. No.: 351,159

[22] Filed: Feb. 22, 1982

[51] Int. Cl.³ ............................................... E05C 5/02
[52] U.S. Cl. ..................................... 292/66; 292/258; 70/19; 70/211; 70/202
[58] Field of Search ............ 292/66, DIG. 2, DIG. 5, 292/258; 70/14, 202, 203, 211, 212, 19

[56] References Cited

U.S. PATENT DOCUMENTS

| | | | |
|---|---|---|---|
| 928,820 | 7/1909 | Tabor | 70/14 |
| 1,850,602 | 3/1932 | Pineo | 70/211 |
| 4,041,738 | 8/1977 | Vann | 70/212 |
| 4,366,683 | 1/1983 | Lobbé et al. | 70/211 X |

Primary Examiner—Richard E. Moore
Attorney, Agent, or Firm—John Cyril Malloy

[57] ABSTRACT

A lock holder including a latch assembly of the type primarily designed to maintain the handle structure of a removable automobile top in its locked or in-line position thereby avoiding the inadvertent or unauthorized removal of the top. An elongated channel or slot is integrally formed within the body of the holder so as to allow sliding engagement of the holder on the handle on the top and forcing it to maintain in its in-line and locked position. A latch assembly protrudes through the slot and separated portions of the handle and is latched on the body itself to prevent removal of the lock holder thereby preventing the handle from being positioned into its broken position allowing removal of the auto top.

8 Claims, 10 Drawing Figures

LOCK HOLDER

BACKGROUND OF THE INVENTION

1. Field of the Invention

This invention is directed towards a lock holder of the type designed for maintaining the conventionally structured handle of a removable top for an automobile in its in-line or locked position through captivating the separated portions of the auto top handle and preventing its inadvertent or unauthorized movement to a "broken" opened position.

2. Description of the Prior Art

For the past few years, American automobile manufacturers have no longer manufactured autos in the convertible style. As a result, automobiles have incorporated a design with removable roof or top panels. Such panels are known as "T-tops". Conventional structures for securing such tops to the automobile in its proper location include a locking or securing handle. For removal of the top, the two part handle structure is positioned in a "broken" orientation or brought into its unlocked position which allows removal of the top. To the contrary, when such tops are secured in place, the handles are disposed in their in-line position where both parts of the top handle are aligned and the latching or locking structure associated with the top causes a fixed position of the top in place.

A problem associated with the handle structure for such T-tops is the inadvertent or unauthorized positioning of the handle into its unlocked position thereby allowing removal of the T-top. When the automobile on which such tops are mounted travels over an extremely rough rough or railroad tracks, etc., such handles have been known to "pop" open by the vibration or jarring of the handles. This advertently causes the handle to be "broken" and thereby causes pivotal movement of opposite portions of the handle into the open position.

In addition, the value of such T-tops is well recognized. Theft of T-tops of this type is relatively common. This is particularly true since it has been found that hitting the top or providing a jar or "shock" to the top can also cause this same "breaking" of the handle whereby both handle portions pivot into their open position. Since T-tops of the type disclosed above cost anywhere from $400–$600, theft of such tops can be a very expensive loss.

In order to prevent the inadvertent or unauthorized removal of the tops it is necessary to keep the handle in their locked or in-line position and prevent pivotal motion of the different portions of the handle. Therefore, there is a need in the industry to provide an inexpensive, simply structured device which will prevent opening or breaking of the handles. Such a structure should again be easy to apply and adaptable to the various structural handles available in the industry.

SUMMARY OF THE INVENTION

This invention is directed towards a lock holder of the type used to maintain a T-top handle structure in its in-line "locked" position thereby insuring a secured position for the top when it is mounted in place on an automobile. More specifically, the lock holder comprises a body having a substantially elongated slot therein which defines a channel means. Overhanging and substantially inwardly directed flanges at least partially define the perimeters of the slot. Said slot and the flanges are specifically configured and dimensioned to allow sliding engagement of the body over the separated or spaced apart portions of the conventional top handle structure.

The aforementioned sliding engagement thereby prevents the separation or "breaking" of the two portions of the handle and accordingly prevents the handle from being positioned into its unlocked position.

Latch means is further provided in the form of a plug reciprocally and rotatably positionable within a centrally located bore. The bore itself is integrally formed within the body and is in direct communication with the slot. This construction allows the latch means and more specifically the plug to pass through the bore into a latched or secured position with one of the flanges. The latch means further comprises an outwardly protruding finger element including an outwardly projecting lip itself partially defined by a cut-out or recess portion wherein the lip and the recess portion are specifically designed to be rotatably positioned into a latched or locked position relative to the one flange. In this position the plug passes through the slot and into interruptive relation between the two handle portions associated with the T-top construction. Therefore, removal of the lock holder and more specifically the body by the intended sliding motion is prohibited. When removal of the body is desired the latch means is rotated out of its latched or engaged position relative to the flange and moves linearly downwardly or outwardly from the slot. The body is thereby slid away from the handle means and the handle structure is allowed to be "broken" or moved into its open position. A pin element is disposed in communicating or exposed relationship to the bore and is disposed to be in interruptive relation to an outer surface recessed portion on the plug. Accordingly, the linear movement of both directions of the latch mens is limitd. A key surface or element is attached to or connectable to the latch means so as to cause its rotational and linear movement. This allows the latch means to be moved into its engaged or latched position relative to the flange.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
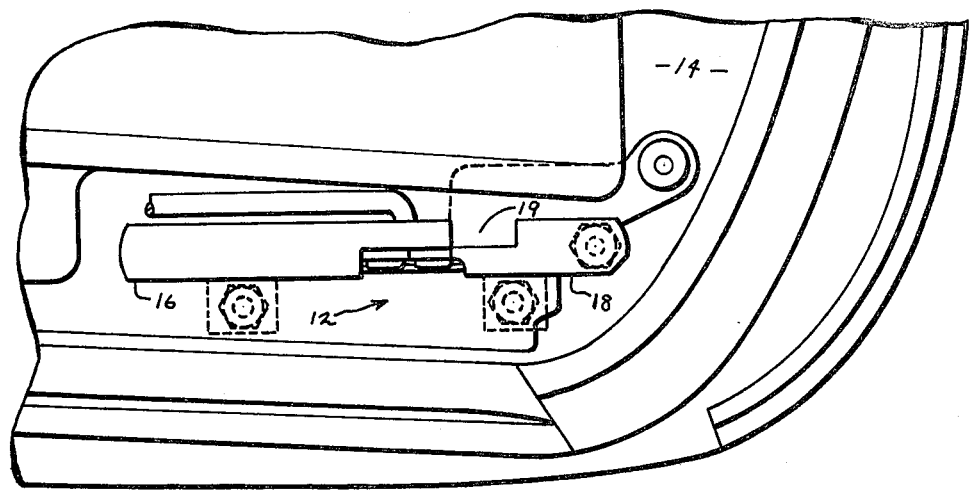
FIG. 1 is a bottom view of a conventional, prior art T-top handle structure in partial cutaway.
Figure 2:
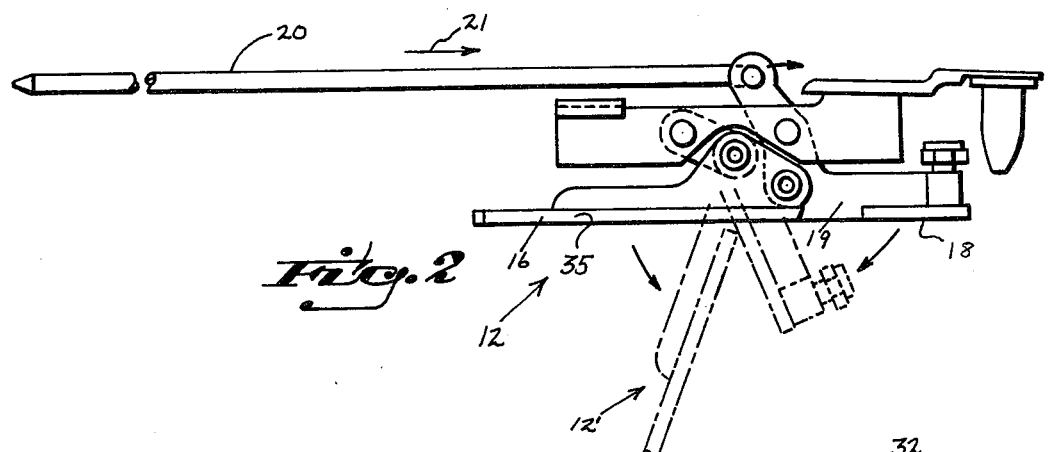
FIG. 2 is a side view of the conventional prior art handle structure as shown in FIG. 1 with the open handle position shown in broken lines.

The present invention is directed towards a lock holder generally indicated as 10 in FIGS. 3 through 6. Such lock holder is specifically designed to be used in combination with a handle assembly 12 (FIGS. 1 and 2). The structure therein represented shows conventional prior art handle structures associated with T-tops 14. Such T-tops are currently used on automobiles as part of the roof structure. Such T-tops are removable by disposing or positioning the handle structure 12 into the open or "broken" position generally represented in broken lines 12'. To the contrary, when the handle structure 12 is brought into its in-line position (FIGS. 1 and 2) both handle portions 16 and 18 are in-line with one another and generally separated by a space area 19. The structures of FIGS. 1 and 2 are presented as representing conventional prior art structures associated with T-tops currently in use in the industry. As best shown in FIG. 2, a locking rod 20 is moved to its unlocking position for the T-top 14 as indicated by directional arrow 21 upon breaking or movement of the handle structure 12 into its broken position indicated in broken lines as 12'.

With regard to the embodiment of the present invention, the lock holder 10 includes a body 22. The body 22 includes a channel means generally indicated as 24 (FIGS. 4, 5, 7, 8 and 10) wherein the channel means is defined at least in part by an elongated slot 26. The elongated slot 26 has its opposite ends open as at 27 and 28 so as to be received in sliding engagement on and off of the two handle portions 16 and 18 of handle structure 12. In addition, the channel means is defined by oppositely disposed and inwardly directed flanges 30 and 32 along the length of the slot 26. More specifically, flanges 30 and 32 overhang the interior of slot 26 and are substantially arranged in parallel relation to one another. Both slot 26 and flanges 30 and 32 are specifically structured, configured and dimensioned to be slidingly mounted on and similarly slidingly removed from the handle portions 16 and 18 such that the flanges serve to captivate the longitudinal marginal edges of handle portions 16 and 18 as at 35 and 36 (FIG. 9).

Figure 8:
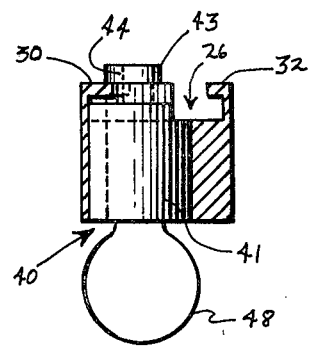
FIG. 8 is a sectional view taken along lines 8—8 of FIG. 6.

With reference to FIGS. 3 through 8 and in particular 7 and 8, the lock holder includes a latch means generally indicated as 40. The latch means there is movably positioned within an integrally formed bore 42 in the body 22 wherein the bore is disposed in communicating relation with the slot 26. In this particular orientation the latch means 40 is movable reciprocally as indicated by directional arrow 42 into and out of the bore and more specifically into and through slot 26. With reference to FIG. 8 the latch means includes a first plug element 41 which is positionable into its latched or locked position as best shown in FIG. 8. In such latched position, an upwardly or outwardly extending finger portion 43 is integrally formed along longitudinal axis of the plug 41 and includes an overhanging lip 44. This lip is at least partially defined by a cut-out portion 45 wherein the cut-out 45 and the lip 44 is specifically designed to overlap and securely engage flange 30. To accommoate rotational movement of plug 40 as it rotates the lip 44 into its overlapping and overhanging position relative to 30, an arcuate recess or cut-out 47 is integrally formed therein.

Accordingly, movement of the latch means 40 and particular finger portion 43 into its locked or latched position is performed by a key element or key surface 48. Such positioning is accomplished by linear directional movement (directional arrow 42) and rotational movement so as to cause positioning of the lip 44 in its overhanging and latched position relative to flange 30.

Figure 9:
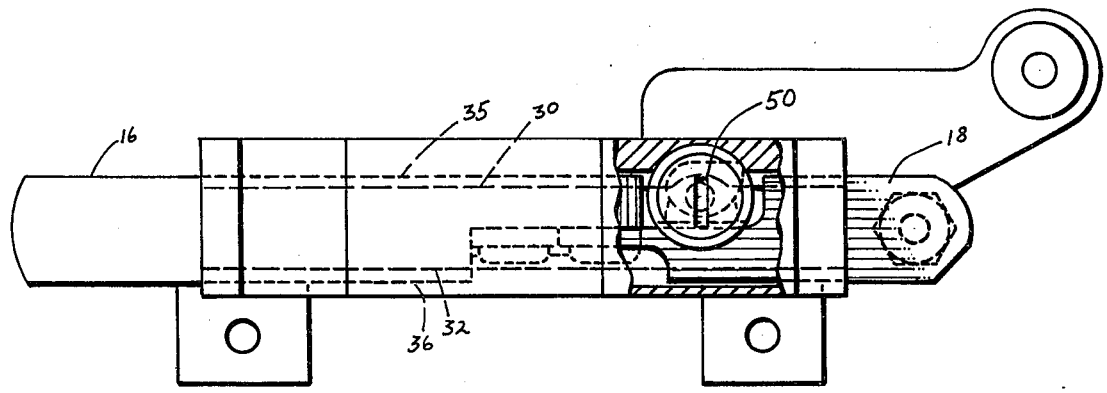
FIG. 9 is a bottom view in partial cutaway and section showing the lock holder of the present invention installed in its latched position on a typical or conventional T-top handle structure.
Figure 10:
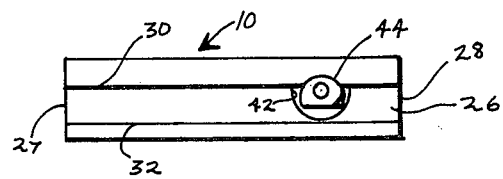
FIG. 10 is a top view of the lock holder of the subject invention in its latched position.

With reference to FIG. 9 a key slot as at 50 is provided in the bottom of the plug 41 for insertion therein of the key surface or element 48 causing linear or rotational movement of the plug 41 or the entire latch means 40 within the bore 42.

Figure 3:
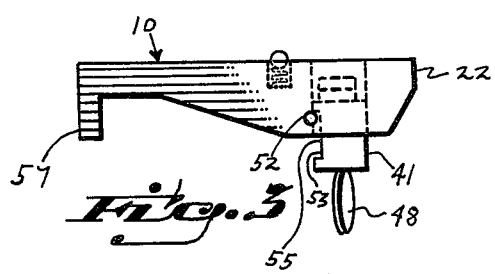
FIG. 3 is an end view of one embodiment of the present invention.
Figure 4:
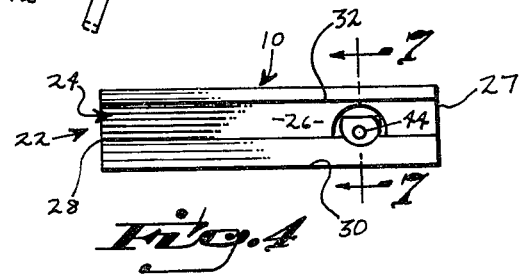
FIG. 4 is a top view of the structure of FIG. 3.
Figure 5:
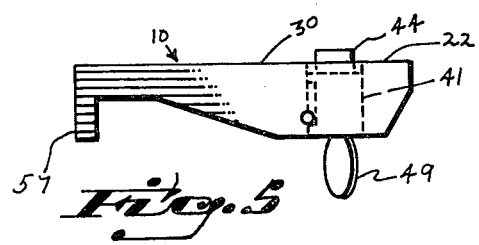
FIG. 5 is a side view of one embodiment of the present invention with the latch means shown in latched or engaged position.
Figure 6:
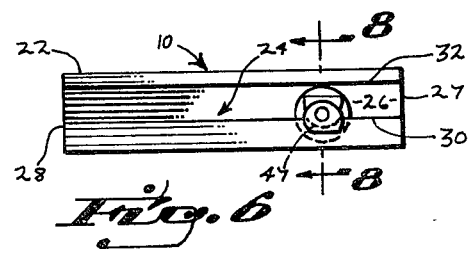
FIG. 6 is a top view of the structure of FIG. 5.
Figure 7:
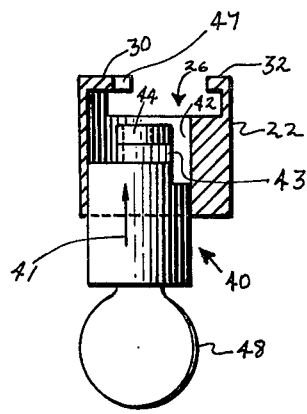
FIG. 7 is a sectional view taken along lines 7—7 of FIG. 4.

With reference to FIGS. 3 and 5, a movement limiting means is provided in the form of a pin 52 mounted on the body 22 in exposed relation to the inner portion of bore 42. More specifically, the pin 52 is exposed to engage the outer surface of the plug 41 and n particular abutt opposite ends of a recess 53 defined by a flat 55. It is readily seen between the different positions of FIGS. 3 and 5 of plug 41 of the opposite linear travel is limited.

Additional structural features of the subject invention, include a handle element 57 disposed in depending relation at one of the body 22 to accomplish the sliding movement of the body 22 or lock holder 10 onto the handle 12 as set forth above.

Additional structure features of the present invention may include a detent means 59 formed in the body and disposed to engage the handle 12 so that rattling or vibrating does not cause undesirable noises, etc. while the lock holder is in place.

Based on the above, it is clear that the operation of the lock holder 10 is such that when the body 22 is placed on both handle portions 16 and 18 in their in-line relation (FIG. 1), latch means 40 is disposed in its latched position (FIG. 8) through the space 19 separating the handle portion 16 and 18. Accordingly, since both the marginal edges of handle portions are captivated within the straight line slot 26, breaking of the handle is prevented and the T-top may not be removed.

It will thus be seen that the objects set forth above, and those made apparent from the preceding description are efficiently attained and since certain changes may be made in the above construction without departing from the scope of the invention, it is intended that all matter contained in the above description or hown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Now that the invention has been described, what is claimed is:

1. A lock holder of the type primarily designed for use with a handle of a removable top structure for automobiles, said lock holder comprising: a body, channel means integrally formed within said body and comprising a substantially elongated slot, said slot partially defined by oppositely positioned, substantially parallel and overhanging flanges, said slot and said flanges structued and dimensioned for sliding disposition on and off the top handle, bore means extending through said body and into communicating relation with said slot, latch means movably mounted within said bore and disposable linearly therein along the longitudinal axis thereof transversely into and out of said slot, and further rotatable within said bore into engaged, latched position with one of said flanges when said latch means is linearly disposed into extended position within said bore through said slot, whereby said latched engagement of said lock assembly relative to said body prevents opening of the top handle in the conventional fashion.

2. A lock holder as in claim 1 wherein said flanges extend substantially along the length of said body and are directed inwardly toward one another thereby at least partially defining said slot and providing surrounding, captivating engagement with the marginal longitudinal edges of the top handle located within said slot.

3. A lock holder as in claim 1 wherein said latch means comprises a finger protruding outwardly from the remainder of said latch means along the axis thereof and including a lip element partially defined by a cut-out portion, both said lip element and said cut-out portion being dimensioned and configured in overlapping, surrounding engagement with said one flange.

4. A lock holder as in claim 3 wherein said one flange comprises an arcuate cut-out portion correspondingly positioned to the point of engagement of said one flange and said lip element so as to allow rotation of said finger element.

5. A lock holder as in claim 1 further comprising pin means secured to said body in exposed relation to said latch means, said latch means including a recessed portion in the outer surface thereof being at least partially defined by a flat, said pin means positioned within said recessed portion in abutting relation with the inner surface of said recessed portion thereby limiting linear and rotational movement thereof.

6. A lock holder as in claim 1 further comprising a key element attached to said latch means and disposed to cause selective linear and rotational movement thereof within said bore means.

7. A lock holder as in claim 1 further comprising handle means secured to said body and configured for grasping and manipulation of said body on and off of sliding engagement with the top handle.

8. A lock holder as in claim 7 wherein said slot is structured to be open at opposite ends thereof and capable of sliding engagement in captivating relation to marginal edges of the top handle, whereby said channel means being disposed in at least partially surrounding relation to spaced apart portion of the top handle thereby maintaining the top handle in an in-line relation.

* * * * *